US009313826B2

(12) United States Patent
Akizuki et al.

(10) Patent No.: US 9,313,826 B2
(45) Date of Patent: Apr. 12, 2016

(54) WIRELESS COMMUNICATION SYSTEM AND MOBILE INFORMATION TERMINAL

(71) Applicant: Panasonic Intellectual Property Management Co., Ltd., Osaka (JP)

(72) Inventors: Ryutan Akizuki, Fukuoka (JP); Noboru Ilda, Fukuoka (JP); Yutaka Ikeda, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/338,058

(22) Filed: Jul. 22, 2014

(65) Prior Publication Data

US 2015/0038122 A1 Feb. 5, 2015

(30) Foreign Application Priority Data

Jul. 31, 2013 (JP) ................................ 2013-158967

(51) Int. Cl.
*H04M 11/00* (2006.01)
*H04M 1/00* (2006.01)
(Continued)

(52) U.S. Cl.
CPC ............ *H04W 88/06* (2013.01); *H04M 1/7258* (2013.01); *H04M 1/72502* (2013.01); *H04W 4/12* (2013.01); *H04M 2250/08* (2013.01); *H04M 2250/60* (2013.01)

(58) Field of Classification Search
CPC ....... H04W 4/12; H04W 88/06; H04W 84/16; H04L 29/08108; H04M 1/72519
USPC ............. 455/412.1–412.2, 413, 414.1, 550.1, 455/552.1, 553.1, 554.1, 555
See application file for complete search history.

(56) References Cited

U.S. PATENT DOCUMENTS 6,052,592 A * 4/2000 Schellinger et al. .......... 455/445
8,532,573 B2 9/2013 Harada et al.
(Continued)

FOREIGN PATENT DOCUMENTS

GB 2 333 423 A 7/1999
JP 6-133353 A 5/1994
(Continued)

OTHER PUBLICATIONS

Extended European Search Report dated Dec. 8, 2014, for corresponding EP Application No. 14177797.9-1972, 7 pages.

*Primary Examiner* — Christopher M Brandt
*Assistant Examiner* — Matthew Genack
(74) *Attorney, Agent, or Firm* — Seed IP Law Group PLLC

(57) ABSTRACT

Disclosed is a wireless communication system capable of easily reconnecting a mobile information terminal and a base unit when a user returns home and letting the user know missed incoming call information or the like. To this end, when being unable to receive a signal from the base unit, the mobile information terminal enters into a sleep state, and when a predetermined operation is performed, the mobile information terminal searches for the base unit, and when reconnecting to the base unit, the terminal displays information on an item transmitted from the base unit on an operation display section. Thus, even when the user returns home but forgets switching an operation mode, the mobile information terminal searches for the base unit as soon as the predetermined operation is performed, and can obtain necessary information from the base unit at home by a simple operation when the user desires the information.

16 Claims, 15 Drawing Sheets

(51) Int. Cl.
*H04W 88/06* (2009.01)
*H04M 1/725* (2006.01)
*H04W 4/12* (2009.01)

(56) References Cited

U.S. PATENT DOCUMENTS

| | | | |
|---|---|---|---|
| 2002/0090947 A1* | 7/2002 | Brooks et al. | 455/436 |
| 2007/0232335 A1 | 10/2007 | Harada et al. | |
| 2008/0176551 A1 | 7/2008 | Kawabata | |
| 2009/0088154 A1* | 4/2009 | Umatt et al. | 455/434 |
| 2010/0067723 A1* | 3/2010 | Bergmann et al. | 381/315 |
| 2011/0064206 A1* | 3/2011 | Karnalkar et al. | 379/88.13 |

FOREIGN PATENT DOCUMENTS

| | | |
|---|---|---|
| JP | 7-95283 A | 4/1995 |
| JP | 9-163450 A | 6/1997 |
| JP | 2003-116166 A | 4/2003 |
| JP | 2004-343608 A | 12/2004 |
| JP | 2007-288598 A | 11/2007 |
| JP | 2007-312170 A | 11/2007 |
| JP | 2008-177915 A | 7/2008 |
| WO | 2011/070570 A1 | 6/2011 |

* cited by examiner

INCOMING CALL HISTORY INFORMATION

| TELEPHONE NUMBER | RECEIVED NAME | MESSAGE ID | ANSWER FLAG | INCOMING CALL TIME |
|---|---|---|---|---|
| 092-234-5678 | A. B. C Co.,LTD | 003 | NON-ANSWERED | 2013/07/24 14:45 |
| 093-345-6789 | (NO RECEPTION) | — | NON-ANSWERED | 2013/07/24 10:10 |
| 094-456-7890 | HIGH Power Co.,LTD | 005 | NON-ANSWERED | 2013/07/24 9:25 |
| 095-567-8901 | (NO RECEPTION) | — | ANSWERED | 2013/07/22 17:05 |
| 096-789-9101 | Ikeda | 006 | ANSWERED | 2013/07/21 12:35 |
| ..... | | | | |

*FIG. 10*

WIRELESS COMMUNICATION SYSTEM AND MOBILE INFORMATION TERMINAL

TECHNICAL FIELD

The present invention relates to a wireless communication system and a mobile information terminal that make an operation for reconnecting a mobile information terminal and a base unit easier, which is performed when a user returns home.

BACKGROUND ART

In recent years, digitalization of cordless telephones used in houses has been in progress, and high-sound quality and improvements in the security of cordless telephones have been made.

When voice or video communication or data is made shareable by building a link between a cordless telephone disposed inside a house and a mobile telephone, the base unit of the cordless telephone and the mobile telephone need to be synchronized with each other so as to be capable of communicating with each other at any time while the mobile telephone is placed in the house. However, when the mobile telephone is taken out to the outside of the house, the communication function of the mobile telephone for communicating with the base unit need not be operated. Even when various communication functions are built in the mobile telephone, putting these functions in operation always causes an increase in power consumption.

For example, Patent Literature 1 discloses a wireless telephone apparatus that avoids increases in power consumption in the case of being out of a service range. According to the disclosure, when it is detected that the wireless telephone apparatus is out of a service range in which electric waves transmitted from the base unit in the house are receivable and when this state of the wireless telephone apparatus continues at least for a predetermined time, the wireless telephone apparatus stops searching for the base unit (open search), thereby avoiding increases in the power consumption when the wireless telephone apparatus is out of the service range. In addition, it is possible to resume searching for the base unit as appropriate by being triggered upon an operation performed in an operation section or the like and to return the wireless telephone apparatus to the communicable state.

Patent Literature 2 discloses, as a system capable of detecting the location of a portable handset without using a GPS, a location detecting system in which a plurality of base units performing short range communication are arranged in a lattice pattern at intervals of a maximum communication distance, so that a portable handset can detect the location of the portable handset by searching for the base units always. According to this location detecting system, a search procedure is repeated in which: the portable handset transmits the ID thereof at the time of finding a base unit; a link is built through authentication given by the base unit; the link is released after the building of the link; and a search for another base unit is performed. Each of the base units herein receives the ID of the portable handset and transmits the received ID to a host computer in this system. Since the location of each base unit is known and is recorded in the host computer, the location of the portable handset can be identified based on the location of the base unit that has communicated with the portable handset having the corresponding ID.

CITATION LIST

Patent Literature

PTL 1
Japanese Patent Application Laid-Open No. 2004-343608
PTL 2
Japanese Patent Application Laid-Open No. 2003-116166

SUMMARY OF INVENTION

Technical Problem

However, according to the related art described above, for example, when a search (open search) for a base unit continues when the user having the mobile information terminal with him goes out, unnecessary power is consumed due to the open search. In addition, if the user forgets to perform an operation for connecting to the base unit at the time of returning to the house while the search for the base unit completely stops when a signal transmitted from the base unit is not detectable, the mobile information terminal and the base unit cannot communicate with each other.

Further, when an incoming call has been received via a fixed line during the user's absence or a message has been recorded, it is preferable that the user be able to check the information immediately when the user returns home, but when the mobile information terminal has completely stopped an operation of searching for the base unit while the user is not home, it is impossible to immediately let the user know the missed incoming call information or the like when the user returns home since the mobile information terminal does not search for the base unit.

In light of the foregoing, it is an object of the present invention to provide a wireless communication system and a mobile information terminal which can easily reconnect a mobile information terminal with a base unit when the user returns home and let the user know missed incoming call information and the like.

Solution to Problem

A wireless communication system according to an aspect of the present invention includes: a base unit that is to be connected to a wired network; and a mobile information terminal including: a short range communication unit configured to communicate with the base unit, using a short range communication protocol; and a public radio communication section that performs radio communication via a public radio network, in which the mobile information terminal further comprises a functional button that activates a connection process of a short range communication link or a stop process of the short range communication link, in which: the mobile information terminal activates the stop process of the short range communication link when the functional button is operated in a state where the short range communication link is connected, and the mobile information terminal activates the connection process of the short range communication link when the functional button is operated in a state where the connection process of the short range communication link is not activated; the mobile information terminal activates the connection process of the short range communication link when a predetermined operation other than the operation of the functional button is performed in a state where the short range communication link is stopped by the functional button, and the mobile information terminal displays, when connected to the base unit, event information transmitted from the base unit on a display section; and the base unit records event information that occurs while the short range communication link with the mobile information terminal is disconnected, and the base unit transmits the event information to the mobile information terminal when connected to the mobile information terminal.

A mobile information terminal according to an aspect of the present invention includes: a short range communication unit configured to communicate with a base unit of a wireless communication system, using a short range communication protocol; and a public radio communication section that performs radio communication via a public radio network, in which the mobile information terminal further includes a functional button that activates a connection process of a short range communication link or a stop process of the short range communication link, in which: the mobile information terminal stops connection of the short range communication link when the functional button is operated in a state where the short range communication link is connected, and the mobile information terminal activates the connection process of the short range communication link when the functional button is operated in a state where the short range communication link is not operated; and the mobile information terminal activates the connection process of the short range communication link and searches for the base station when a predetermined operation other than the operation of the functional button is performed in a state where the short range communication link is stopped by the functional button, and the mobile information terminal displays, when connected to the base unit, event information transmitted from the base unit on a display section.

According to the present invention, performing a predetermined operation by the user when the user returns home enables the mobile information terminal to start searching (open search) for the base unit immediately, to be reconnected with the base unit, and to acquire missed incoming call information and the like even in a sleep state (or when a short range radio communication operation is turned off).

BRIEF DESCRIPTION OF DRAWINGS

FIG. 10 is an explanatory diagram that illustrates an example of incoming call history information recorded in the base unit in the wireless communication system;

DESCRIPTION OF EMBODIMENTS

Hereinafter exemplary embodiments of the present invention will be described in detail with reference to the appended drawings.

Embodiment 1

Figure 1:
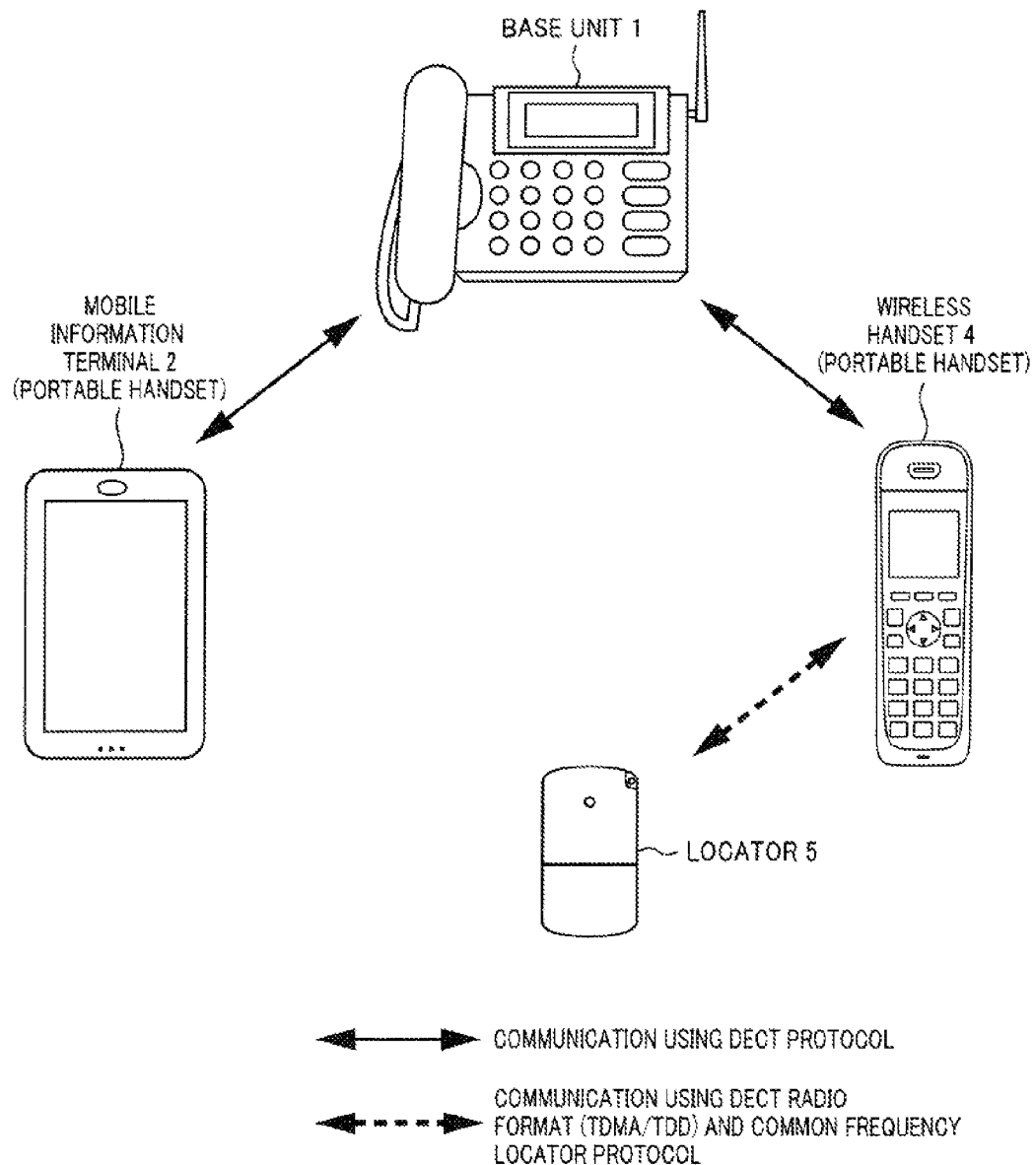
FIG. 1 is a diagram that illustrates a configuration example of a wireless communication system according to Embodiment 1 of the present invention.

First, an example of the configuration of a wireless communication system according to Embodiment 1 of the present invention will be described. FIG. 1 is a diagram that illustrates an example of the configuration of the wireless communication system according to this embodiment.

As illustrated in FIG. 1, the wireless communication system includes base unit 1, mobile information terminal 2 that operates as a portable handset to be registered in base unit 1, and wireless handset 4. Base unit 1 is connected to a wired network. Base unit 1, mobile information terminal 2, and wireless handset 4 perform communication using a communication protocol in which a radio format and a frequency are a time division multiple access (TDMA)/time division duplex (TDD) mode. In this embodiment, for example, in-house wireless communication according to a digital enhanced cordless telecommunications (DECT) standard is performed.

Mobile information terminal 2 includes DECT telephone function software as application software, and is capable of performing communication according to the DECT standard. Further, mobile information terminal 2 is connectable to base unit 1 through a universal serial bus (USB) port installed therein.

Further, mobile information terminal 2 is a communication terminal that can be not only placed inside the house but also taken out and placed outside the house, and for example, is a mobile information terminal (a PDA or a tablet terminal) or the like that includes a touch panel and is connectable to a mobile telephone network and the Internet through a public radio network.

Mobile information terminal 2 is connectable to an IP network, for example, through 802.11 standard communication, and mobile information terminal 2 can be connected to the IP network through 802.11 standard communication or connected to the wired network through in-house wireless communication and correspond to reception or origination of a phone call.

Wireless handset 4 is for in-house use only, and performs in-house wireless communication with base unit 1 according to the DECT standard and is mainly used when performing a phone call through the wired network. FIG. 1 illustrates only one wireless handset 4, but a plurality of wireless handsets 4 may be provided.

Base unit 1 is a reference for the synchronization of radio communication of the DECT mode, and mobile information terminal 2 and wireless handset 4 operate as slave apparatuses that follow the synchronization reference of base unit 1. Further, mobile information terminal 2 operates as a slave apparatus that follows the synchronization reference. As identification information of mobile information terminal 2 is registered to base unit 1 of the wireless communication system, base unit 1 treats mobile information terminal 2 as a portable handset having the almost same status as wireless handset 4.

Wireless handset 4 can perform communication with locator 5 as well. Wireless handset 4 has a function of communicating with locator 5 using a locator protocol including a mode in common with the DECT, and transmits a calling signal to locator 5 using the locator protocol, and receives a corresponding response signal from locator 5, for example.

Figure 2:
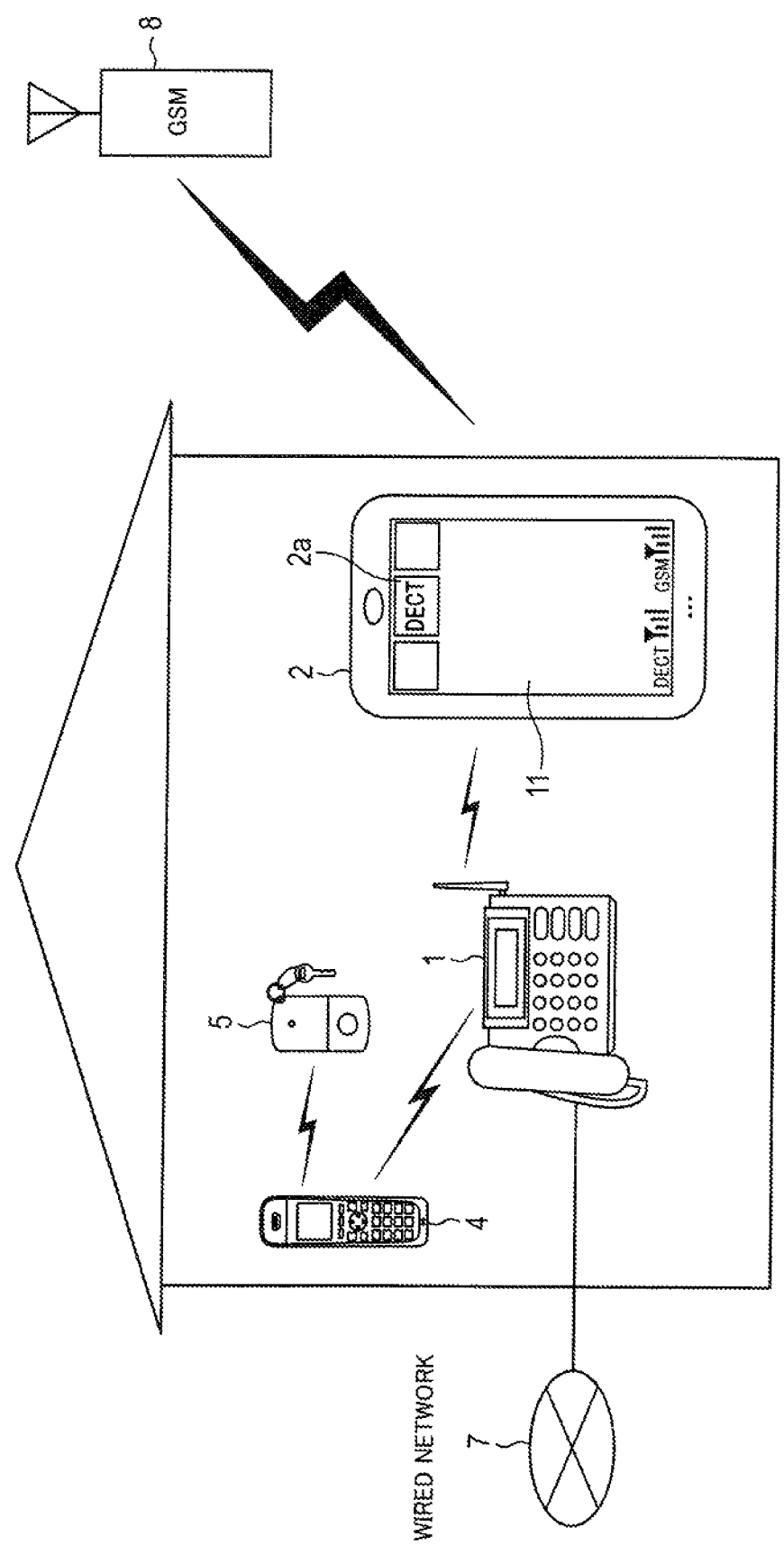
FIG. 2 is a schematic diagram that illustrates an example of the use form of the wireless communication system.

FIG. 2 illustrates the state where mobile information terminal 2 is located near base unit 1 (for example, inside the house) in the wireless communication system illustrated in FIG. 1. Base unit 1 is connected to wired network 7. Mobile information terminal 2 is communicable with the mobile telephone network through public radio network 8, is communicable with base unit 1 through in-house wireless communication using the DECT mode, and is also communicable with the outside using wired network 7 through base unit 1.

When there is an incoming call through wired network 7, but no one answers it, base unit 1 sets a missed incoming call flag in an incoming call history record, and accumulates incoming call information (a caller telephone number, a caller name, a time, and the like). Further, when a voice mail message is recorded, a message ID identifying the message is recorded. Further, when a connection request is received from mobile information terminal 2, base unit 1 transmits data indicating information related to the missed incoming call history to mobile information terminal 2. This case will be described in detail later.

Figure 3:
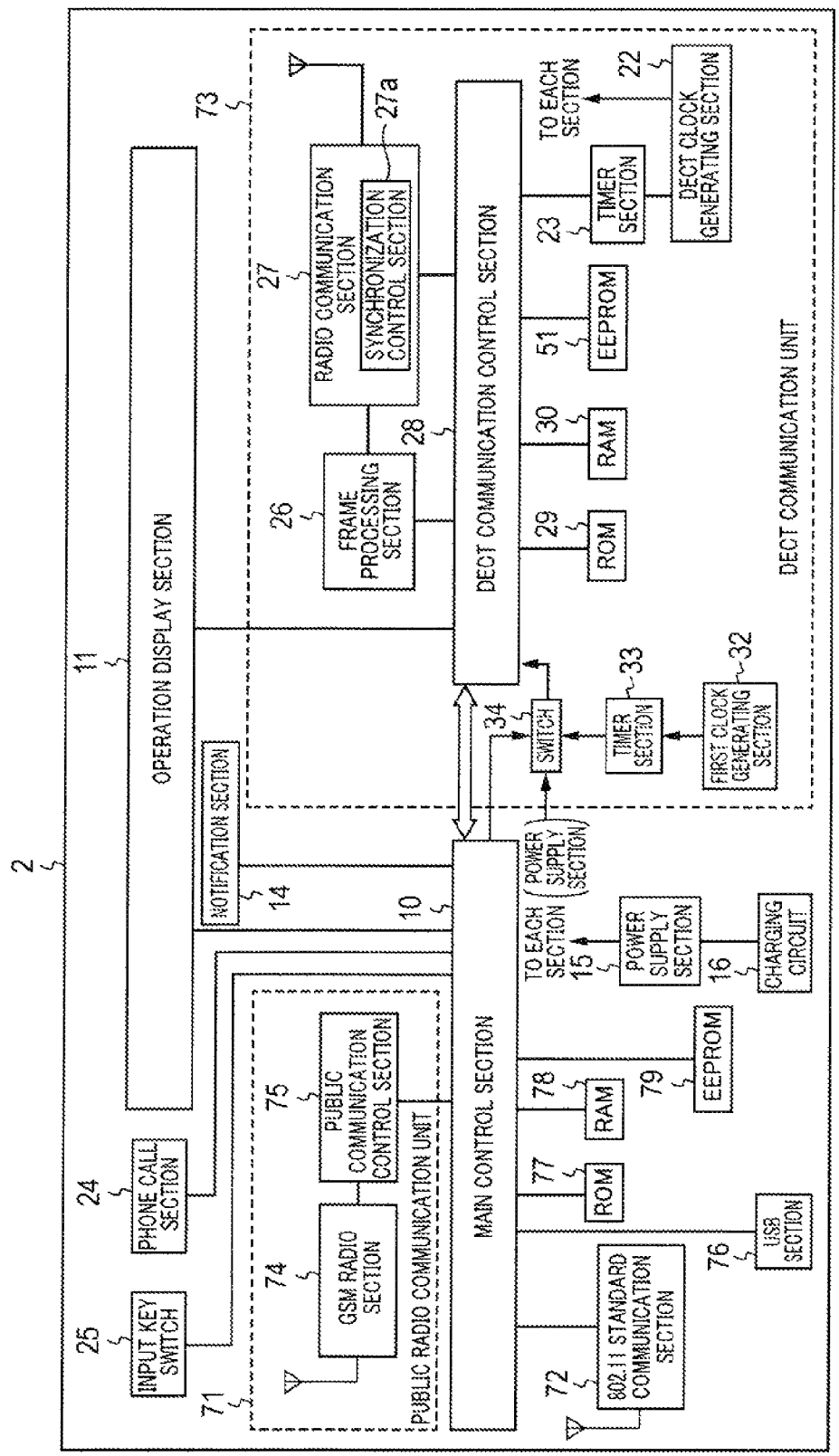
FIG. 3 is a block diagram that illustrates a configuration example of a mobile information terminal of the wireless communication system.

A configuration example of mobile information terminal 2 will be described below. As illustrated in FIG. 3, mobile information terminal 2 includes main control section 10 that is configured by a microcomputer as its central constituent member. In addition, operation display section 11 such as a touch panel used for receiving various operations and displaying various states is included therein. Operation display section 11 includes a touch key that is externally exposed and a liquid crystal display. Phone call section 24 includes a microphone, a speaker, a voice amplifier, and the like that are used for making a voice call.

Notification section 14 has a function of an incoming call notification section and a function for generating a confirmation sound, for example, upon the operation of an input key. Notification section 14, for example, includes a small speaker, and in a case where a calling signal is received from base unit 1, outputs a notification sound when a calling signal is received through public radio network 8.

In addition, mobile information terminal 2 includes three radio communication sections, in other words, public radio communication unit 71, 802.11 standard communication section 72, and DECT communication unit 73 that is based on the DECT.

Public radio communication unit 71 performs radio communication with public radio network 8 using electric waves. 802.11 standard communication section 72 performs location detection using a global positioning system. In addition, DECT communication unit 73 communicates with specific apparatuses such as base unit 1 of a cordless telephone of the DECT mode that is placed mainly in a house.

Mobile information terminal 2 is equipped with power supply section 15 mainly including a secondary battery that supplies power to each section and charging circuit 16 that charges the secondary battery of power supply section 15, and all of these components are housed inside a case of a portable size. Power supply section 15 supplies power used for operating public radio communication unit 71, 802.11 standard communication section 72, and main control section 10 in addition to DECT communication unit 73.

Phone call section 24 includes a voice amplifier, a speaker, a microphone, and the like that are used for making a voice call. Input key switch 25 is a key switch that enables an operation input of an emergency notification or the like.

Public radio communication unit 71 includes GSM (register trademark) radio section 74 that demodulates a received signal received by an antenna, outputs the received data, and outputs a transmission signal acquired by modulating transmission data toward an antenna and public communication control section 75 that controls the operation of GSM radio section 74.

Mobile information terminal 2 includes 802.11 standard communication section 72 and USB section 76. 802.11 standard communication section 72 is connectable to the internet through the 802.11 standard communication. USB section 76 is a highly versatile serial interface capable of transmitting and receiving data at a high speed. In this embodiment, mobile information terminal 2 includes the USB interface, but USB section 76 need not be provided when communication that requires setting or the like is performed with base unit 1 using in-house wireless communication according to the DECT standard.

Read only memory (ROM) 77 of mobile information terminal 2 stores an operating system (OS) for operating mobile information terminal 2, phone call function software managed by the OS, other programs, or the like. Further, ROM 77 stores a program of performing initial diagnosis of mobile information terminal 2 when power is turned on or a program of reading the OS.

Random-access memory (RAM) 78 of mobile information terminal 2 is used for development of the OS for operating mobile information terminal 2, the phone call function software managed by the OS, or programs of other applications, and used as a working area of each program.

Electrically erasable programmable read-only memory (EEPROM) 79 is used as a working area of main control section 10. Further, EEPROM 79 stores programs of various kinds of applications installed by the user as files.

Main control section 10 of mobile information terminal 2 executes each program, and controls overall mobile information terminal 2. Main control section 10 always monitors an operation input performed by operation display section 11 on a processing program around a microcomputer, and performs processing according to the input. Public radio communication unit 71, 802.11 standard communication section 72, and DECT communication unit 73 are controlled by main control section 10.

Operation display section 11 such as a touch panel serves as a user interface (UI) used for receiving various user operations. Operation display section 11, for example, includes a touch panel that is placed on the surface of the liquid crystal display.

On operation display section 11 displays a numeric key, a functional key, or the like, and when the key is touched, main control section 10 reads operation information corresponding to the key. Further, through control of main control section 10, a telephone number or various kinds of data transmitted from base unit 1 is displayed on the liquid crystal display of operation display section 11.

As the user operations, there are display operations for a telephone directory, an operation menu, and the like in addition to the reception/origination of a phone call, and operations of all the applications as an information terminal are performed by operation display section 11. In addition, an operation (calling operation) for calling locator 5, display and other operations performed for allowing a user to check the status relating to the operation of locator 5, and the like are performed by this operation display section 11.

DECT communication unit 73 of mobile information terminal 2 outputs a radio signal obtained by modulating voice data to base unit 1, and demodulates data transmitted through a radio signal from base unit 1.

DECT communication unit 73 includes: first clock generating section 32, timer section 33, and switch 34. In addition, DECT communication unit 73 includes a communication block that includes a control section for DECT communication and the other parts used for communication, and the communication block and the other parts operate using power that is supplied when switch 34 is turned on. This communication block includes DECT clock generating section 22, timer section 23, frame processing section 26, radio communication section 27, DECT communication control section 28, read only memory (ROM) 29; random-access memory (RAM) 30, and electrically erasable programmable read-only memory (EEPROM) 51.

First clock generating section 32 generates a clock signal used for operating timer section 33 based on the power that is always supplied from power supply section 15. First clock generating section 32, for example, includes a crystal oscillation circuit.

Radio communication section 27 performs radio communication that is compliant with the DECT standard with base unit 1. Synchronization control section 27a arranged inside radio communication section 27 determines the communication timing of a communication signal according to radio communication section 27 based on a reference clock of DECT clock generating section 22.

DECT communication control section 28, for example, includes a central processing unit (CPU) and controls a DECT communication operation in cooperation with each section. The control process performed by DECT communication control section 28 will be described later.

Frame processing section 26 generates a signal using a protocol matching the operation mode at that time and passes a signal of the frame configuration including identification information of a communication opponent selected by DECT communication control section 28 to radio communication section 27. Various signals are transmitted from radio communication section 27. In addition, frame processing section 26 receives signal data received by radio communication section 27 and extracts necessary information in accordance with a protocol matching the operation mode at that time.

For example, when a start operation of the DECT communication mode is performed through operation display section 11, DECT communication control section 28 starts an operation of searching for a control signal of base unit 1 by controlling radio communication section 27. The signal received by radio communication section 27 is transmitted to DECT communication control section 28. In a case where the received signal is a control signal transmitted from base unit 1, information that is needed for the synchronization is extracted from the received data, and the extracted information is passed to DECT communication control section 28 and radio communication section 27.

EEPROM 51 stores an ID of mobile information terminal 2 itself (hereinafter, referred to as a "mobile information terminal ID") and an ID of base unit 1. The mobile information terminal ID is a unique identifier that is assigned in advance.

DECT clock generating section 22 includes, for example, a crystal oscillation circuit, and operates by power supplied from power supply section 15 via switch 34, and supplies a high-speed clock signal faster than the low-speed clock signal of first clock generating section 32 to each section of the communication block, and an operation for communication is controlled in accordance with this high-speed clock signal. Synchronization control section 27a provided in radio communication section 27 determines communication timing of a communication signal according to radio communication section 27 based on a reference clock of DECT clock generating section 22.

DECT communication control section 28 operates based on the clock signal that is generated by DECT clock generating section 22 and controls the overall operation of the communication block. DECT communication control section 28 controls communication with base unit 1 by executing a control program that is stored in ROM 29.

Timer section 23 counts a specified period of time based on the clock signal supplied from DECT clock generating section 22, and can count a plurality of periods of time separately. For example, timer section 23 operates as a second timer. The second timer starts counting by being triggered upon the reception of a signal transmitted from base unit 1 (start of the second timer) and ends the counting in accordance with the elapse of a predetermined time (expiration of the second timer). In addition, timer section 23 operates as a third timer. The third timer starts counting by being triggered upon the insertion of the battery into power supply section 15 (start of a third timer) and ends the counting in accordance with the elapse of a predetermined time (expiration of the third timer).

RAM 30 is a working memory of DECT communication control section 28. EEPROM 51 stores various kinds of registration information related to DECT communication.

Hereinafter, an intermittent operation of DECT communication unit 73 of mobile information terminal 2 will be described. In the On state, switch 34 supplies power to the communication block from power supply section 15. On the other hand, in the Off state, switch 34 blocks the supply of power to the communication block. When the supply of power is blocked, the communication block is in a sleep state.

Timer section 33 operates as a first timer. The first timer counts a time period set in advance as a sleep period of the communication block and switches switch 34 from the Off state to the On state each time when such a period expires. In other words, timer section 33 is supplied with a low-speed clock from first clock generating section 32 and performs a counting process in accordance with the low-speed clock.

Timer section 33 records a value (expiration value) used for determining the sleep period in a register (not illustrated in the drawing) thereof. Then, timer section 33 counts up in accordance with a clock signal transmitted from first clock generating section 32 in a sleep state and ends the counting when the counted value arrives at the expiration value. Then, timer section 33 notifies switch 34 of the end of the counting.

In other words, timer section 33 starts counting by being triggered upon the stop of power supply to the communication block (start of the first timer) and counts a predetermined time period during the stop of the communication block. Then, when the counting ends (the first timer expires), timer section 33 switches switch 34 to the On state and starts supplying power to the communication block.

In this way, DECT communication unit 73 of mobile information terminal 2 performs an intermittent reception operation even in the outdoor mode and repeats operations of returning from the sleep period at a predetermined interval, performing a reception operation for a predetermined period, and returning to the sleep state. In accordance with the notification of the end of the counting from timer section 33 described above, switch 34 is switched to the On state from the Off state and starts supplying power to the communication block.

Here, the functional sections included in mobile information terminal 2 are not limited to the functional sections illustrated in FIG. 3, and another functional section may be included therein. The other functional section may be used either for realizing main functions of mobile information terminal 2 or for realizing an auxiliary function for supporting a main function.

Figure 4:
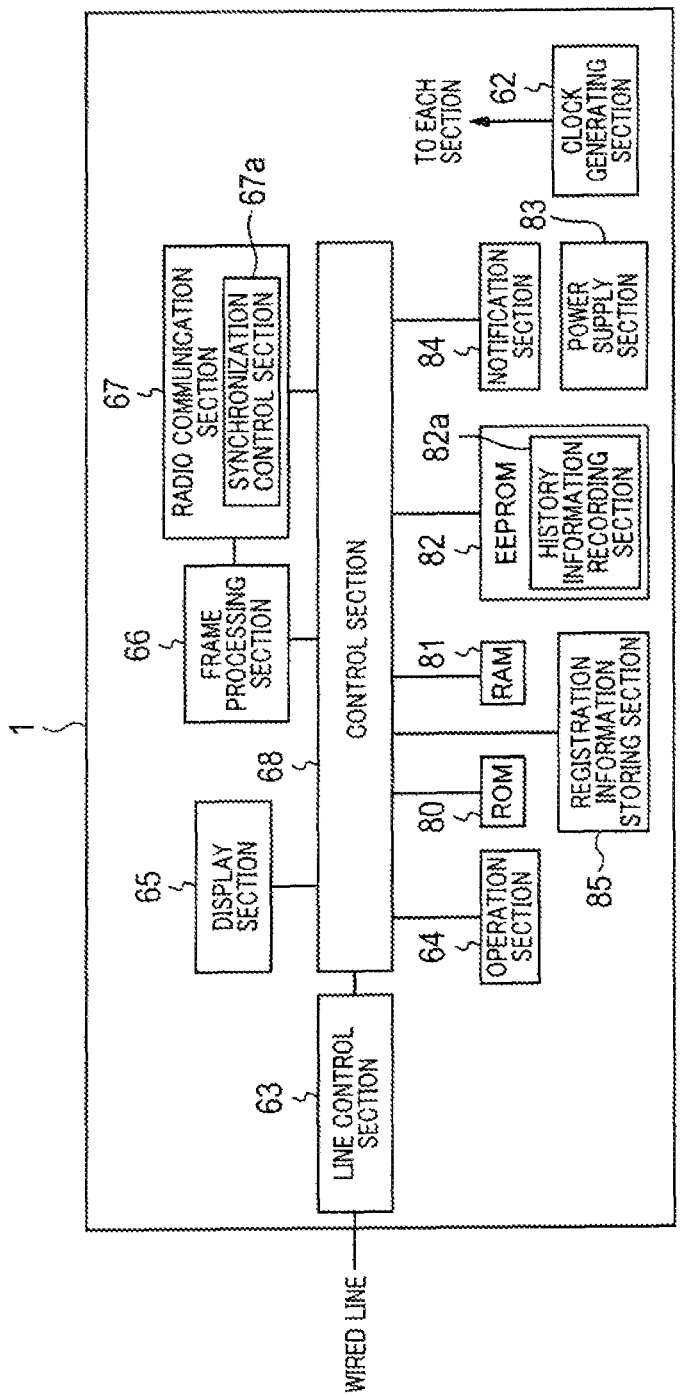
FIG. 4 is a block diagram that illustrates a configuration example of a base unit of the wireless communication system.

Next, a configuration example of base unit 1 will be described. FIG. 4 is a block diagram that illustrates the configuration example of base unit 1.

As illustrated in FIG. 4, base unit 1 includes clock generating section 62, line control section 63, operation section 64 used to input a transmission destination telephone number, display section 65 that displays various kinds of information, a telephone number, or the like, frame processing section 66, radio communication section 67, and control section 68. Control section 68 is a control section that executes each program, and controls overall base unit 1.

In addition, base unit 1 includes ROM 80, RAM 81, EEPROM 82, power supply section 83, notification section 84, and registration information storing section 85. Further, in FIG. 4, illustration of a microphone, a speaker, and the like, which are installed in a receiver, is omitted.

Power supply section 83 supplies power that is used for operating base unit 1. Clock generating section 62 generates a clock signal used for operating each section of base unit 1 based on the power that is supplied from power supply section 83. Clock generating section 62, for example, includes a crystal oscillation circuit. Line control section 63 communicates with a wired telephone network.

Line control section 63 outputs a voice signal obtained by modulating voice data received from control section 68 to the wired network, and outputs voice data obtained by demodulating a voice signal received from the wired network to control section 68.

Radio communication section 67 performs in-house wireless communication with each portable handset according to the DECT standard, and outputs a radio signal obtained by modulating data received from control section 68 to the portable handset (wireless handset 4 or mobile information terminal 2), and outputs data obtained by demodulating a radio signal received from each portable handset to control section 68.

Operation section 64 includes buttons used for receiving various user operations. Display section 65, for example, includes a liquid crystal display, and for example, displays a telephone number, an operation menu of base unit 1, and the like.

Frame processing section 66 embeds frame transmission information matching an operation mode of that moment and transfers the frame transmission information to radio communication section 67. The frame configuration of DECT is used when frame processing section 66 communicates with mobile information terminal 2 or wireless handset 4, and the frame configuration for the locator is used when frame processing section 66 communicates with locator 5.

Radio communication section 67 performs radio communication with mobile information terminal 2 and another wireless handset using the TDMA/TDD mode. In this embodiment, radio communication section 67 performs radio communication, for example, using the DECT protocol. Synchronization control section 67a provided in radio communication section 67 determines communication timing of a communication signal according to radio communication section 67 based on the reference clock of clock generating section 62.

Control section 68 includes a CPU and controls the overall operation of base unit 1 in cooperation with the above-described sections. ROM 80, for example, stores control programs used by control section 68 and various kinds of data therein.

RAM 81 stores a program for controlling base unit 1. RAM 81 and EEPROM 82 are used as working areas in which control section 68 executes the program stored in ROM 80.

Notification section 84, for example, includes a small speaker and outputs a notification sound when a calling signal is received from line control section 63.

Registration information storing section 85 stores an ID of each portable handset serving as a communication counterpart, that is, an ID of mobile information terminal 2 and IDs of other wireless handsets as well as an ID of base unit 1. Information of portable handset state management section (not illustrated) of registration information storing section 85 is periodically updated, a flag of "response present" is recorded for a portable handset that normally responds to a control signal transmitted by base unit 1, and a flag "no response" is recorded for a portable handset that does not respond to the control signal.

The configuration example of base unit 1 has been described thus far.

Figure 5:
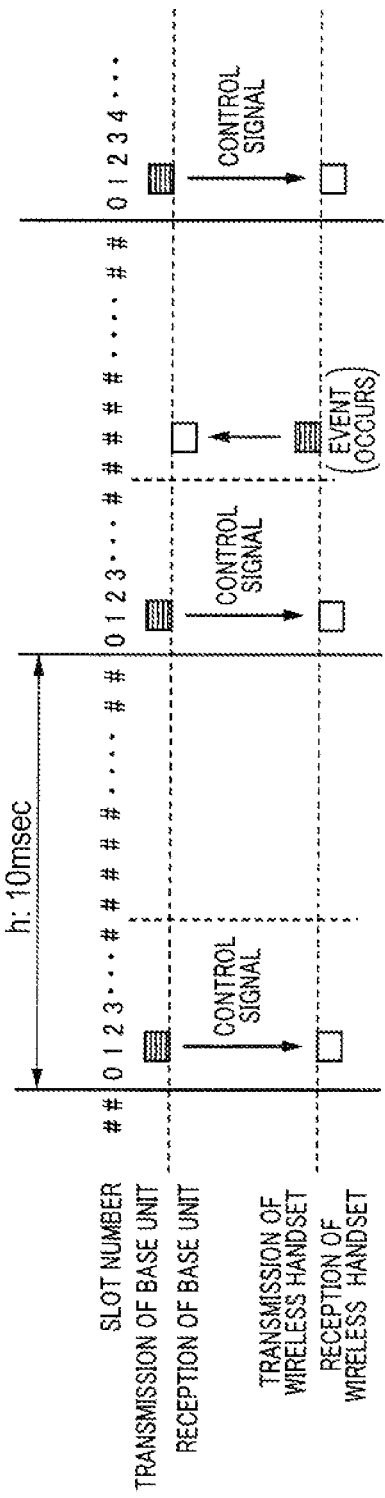
FIG. 5 is a timing diagram that illustrates an example of TDMA communication between the base unit and a wireless handset (or the mobile information terminal) in a normal state in the wireless communication system.

Next, a configuration example of a communication frame in TDMA communication used in this embodiment will be described with reference to FIG. 5. FIG. 5 illustrates an example of TDMA communication performed between base unit 1 and a wireless handset (or mobile information terminal 2) in the normal state.

In radio communication according to DECT, for example, as illustrated in FIG. 5, a time division mode is used in which communication is performed by setting 10 msec as one frame and dividing one frame into 24 slots. Base unit 1 transmits the base unit ID using a control signal, and the wireless handset (or mobile information terminal 2) acquires the base unit ID while receiving the control signal, compares the acquired base unit ID with the ID of a base unit (registered base unit) for which mobile information terminal 2 stands by, and selects a base unit to be synchronized with.

In addition, during the standby, the wireless handset 4 (or mobile information terminal 2) transmits nothing to base unit 1 for every frame, and transmission from the wireless handset 4 (or mobile information terminal 2) to base unit 1 is performed only when an event such as an outgoing call occurs and a phone call state is formed. In such a case, the wireless handset 4 (or mobile information terminal 2) selects one slot and performs communication using uplink and downlink slots thereof.

Base unit 1 always transmits a control signal in a predetermined slot for each frame. A control signal serving as a synchronization signal includes synchronization data (for example, Syncword). The Syncword is a known digit sequence determined in advance for timing synchronization and is synchronization information used for the synchronization of mobile information terminal 2. The reception side starts cutting out and taking in a frame at a time point when this known digit sequence is found.

In the DECT mode, a unique Syncword is assigned to each network, and the Syncword is included to be common to signals transmitted from terminals.

Figure 6:
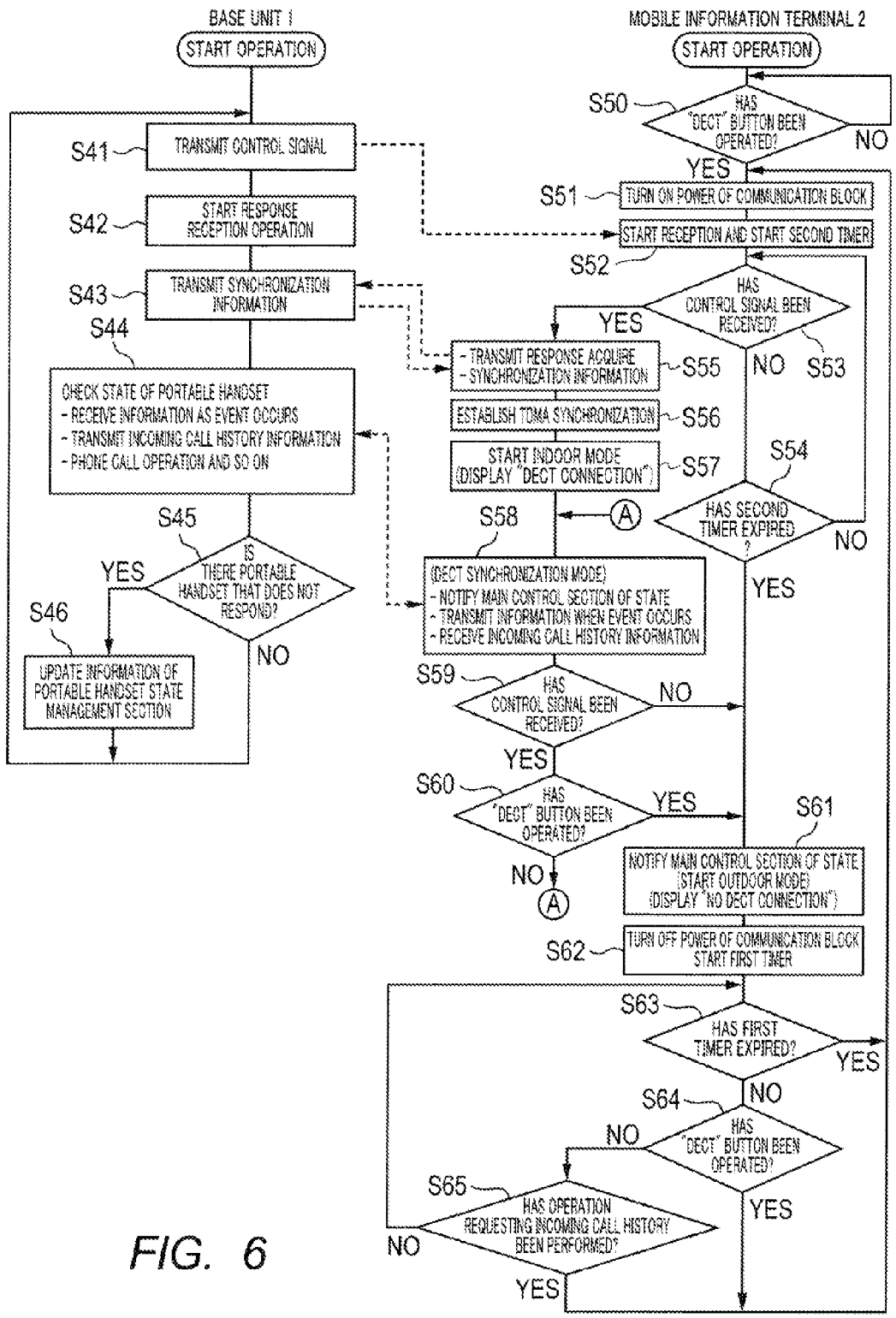
FIG. 6 is a flowchart that illustrates an operation example of the mobile information terminal for being synchronized with the base unit in the wireless communication system.

Next, an operation example of the above-described wireless communication system will be described. FIG. 6 is a flowchart that illustrates an operation example of DECT communication unit 73 of mobile information terminal 2 for searching for base unit 1 and the operation of mobile information terminal 2 for being synchronized with base unit 1 in the wireless communication system.

First, base unit 1 will be described. When base unit 1 starts an operation by being supplied with power, the standby mode started, and in Step S41, base unit 1 starts transmitting a control signal. In addition, in Step S42, base unit 1 performs an operation of receiving a response signal transmitted from each portable handset using a reception slot having predetermined time/position relationship with respect to the slot in which the control signal is transmitted. In addition, in Step S43, acquisition of synchronization information is inserted into the control signal and is transmitted.

In mobile information terminal 2, when the power switch (not illustrated in the figure) is turned on, main control section 10 and each section are supplied with power, and an operation starts. When the operation starts, the "DECT" button (a reference numeral 2a in FIG. 2) by which the user gives an instruction to start DECT communication is displayed on operation display section 11 as illustrated in FIG. 2.

For example, when the "DECT" button is pressed down in the state in which DECT communication unit 73 is operating, main control section 10 determines that the DECT communication operation is to be stopped, and performs control such that switch 34 is turned off to stop the operation of DECT communication unit 73. Further, when the "DECT" button is pressed down in the state in which DECT communication unit 73 does not operate, main control section 10 determines that the DECT communication operation is to be started, and performs control such that switch 34 is turned on to start the operation of DECT communication unit 73.

When it is determined in Step S50 that the user has operated the "DECT" button (YES in S50), main control section 10 detects the operation, and main control section 10 performs control such that switch 34 is turned on using the detection as a trigger. When main control section 10 turns on switch 34, and power is supplied to the communication block of DECT communication unit 73, DECT communication control section 28 starts its operation (Step S51). Information about the "DECT" button operation detected by main control section 10 is sent to DECT communication control section 28.

When power is supplied to DECT communication unit 73 in Step S51, DECT communication control section 28 of DECT communication unit 73 instructs radio communication section 27 to start a reception operation of continuously searching (open search) for a signal transmitted from base unit 1 (Step S52). Then, the second timer is started by timer section 23 that counts high-speed clock signals transmitted from DECT clock generating section 22. In accordance with the starting of the second timer, mobile information terminal 2 becomes in a state in which a signal transmitted from base unit 1 can be received.

When a control signal transmitted from base unit 1 is received by radio communication section 27 in Step S53 (Yes in Step S53), the flow proceeds to Step S55. On the other hand, when a control signal is not received in Step S53 (No in Step S53), the flow proceeds to Step S54.

When the control signal has not been received, in Step S54, DECT communication control section 28 determines whether or not the second timer has expired. In a case where the second timer has not expired (No in Step S54) as a result of the determination made in Step S54, the flow returns to Step S53. On the other hand, in a case where the second timer has expired (Yes in Step S54) as a result of the determination made in Step S54, the flow proceeds to Step S61.

When the control signal has been received, in Step S55, DECT communication control section 28 transmits a response signal through radio communication section 27. In Step S56, in accordance with information transmitted from base unit 1, DECT communication control section 28 sets up TDMA synchronization with base unit 1. The operations of Steps S52 to S56 are illustrated in FIG. 5 described above.

In Step S57, DECT communication control section 28 determines that DECT communication can be performed and transfers the information to main control section 10, and main control section 10 starts the indoor mode and performs a display operation indicating "DECT connection" on operation display section 11. For example, an antenna mark is displayed near "DECT" characters.

In Step S58, DECT communication unit 73 communicates with base unit 1 in the DECT synchronization mode. During standby, as illustrated in FIG. 5, the synchronization state is maintained while a control signal transmitted from base unit 1 is received. Then, when an event occurs, a signal related to DECT communication unit 73 is transmitted to base unit 1.

For example, when the user of mobile information terminal 2 performs a call origination operation in a fixed-line telephone, a signal indicating a call origination operation is transmitted to base unit 1. Meanwhile, in a case where information representing that there is an incoming call from a fixed-line telephone network is transmitted in accordance with a control signal transmitted from base unit 1, as illustrated in FIG. 5, DECT communication unit 73 transmits various notification signals to base unit 1. In addition, base unit 1 is notified of other necessary information such as received signal strength or error information.

Further, when the user of mobile information terminal 2 has performed an operation for requesting the incoming call history or an operation for transmitting the connection request to the base unit, DECT communication unit 73 transmits a signal for requesting the incoming call history to base unit 1. Base unit 1 transmits information related to the missed incoming call history to mobile information terminal 2 according to the request from mobile information terminal 2.

In addition, in Step S58, in a case where a voice phone call is started through the fixed-line telephone network, DECT communication unit 73 transmits or receives voice data to/from base unit 1 by using one slot for each of uplink/downlink.

In a case where DECT communication unit 73 cannot receive a control signal transmitted from base unit 1 in Step S59 (No in Step S59), DECT communication control section 28 determines that DECT communication is not possible, and transfers the information to main control section 10, and the flow proceeds to Step S61. In a case where DECT communication unit 73 receives a control signal transmitted from base unit 1 (Yes in Step S59), the flow proceeds to Step S60.

Figure 7:
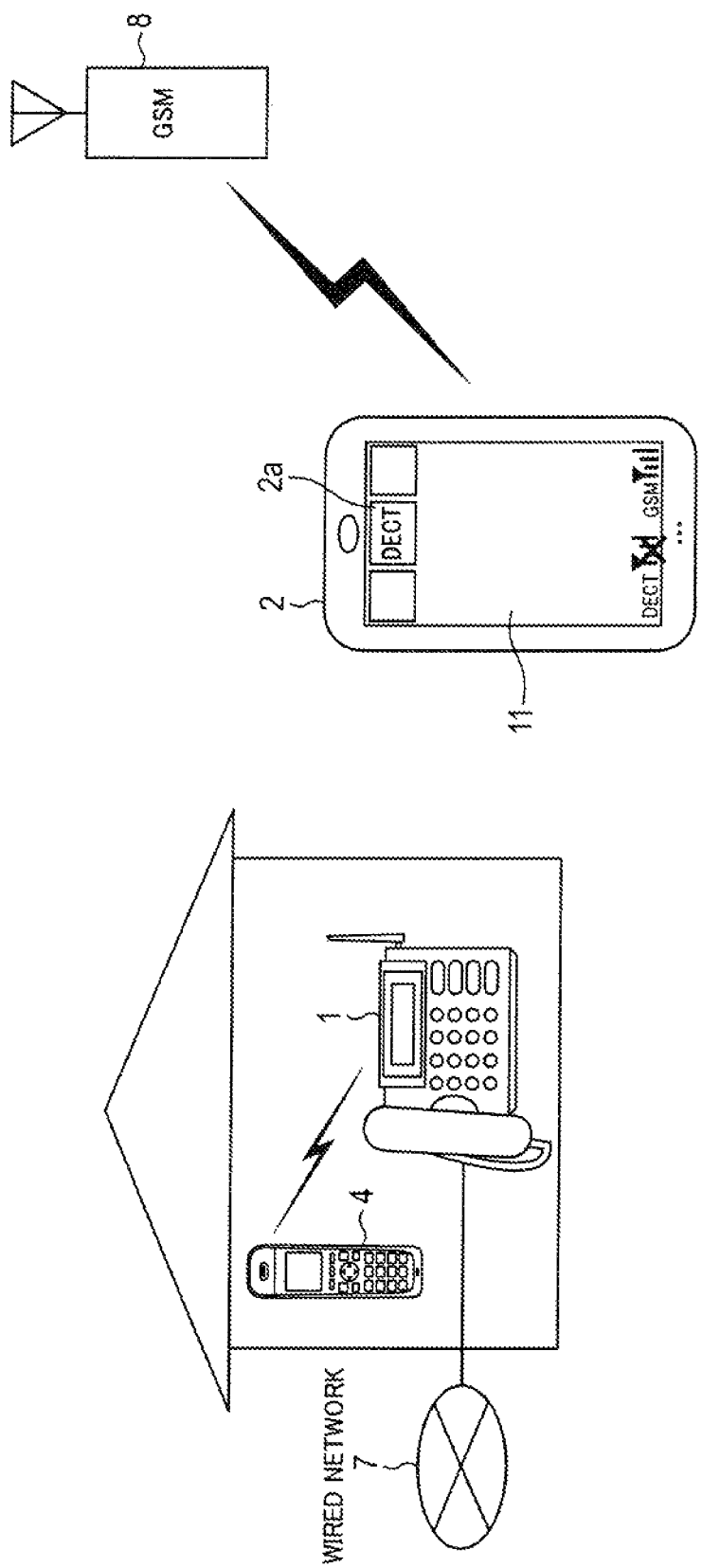
FIG. 7 is an explanatory diagram that illustrates an example of a case where a user having the mobile information terminal with him goes out in the wireless communication system according to the present invention.

In Step S61, main control section 10 starts the outdoor mode and performs a display operation to indicate "No DECT connection" on operation display section 11. For example, as illustrated in FIG. 7, "x" is displayed on the antenna mark disposed near the "DECT" characters in an overlapping manner. Then, in Step S62, DECT communication unit 73 blocks power to the communication block by turning off switch 34.

In Step S60, it is determined whether or not the above-described "DECT" button (2a) has been operated. When the "DECT" button has been operated in the state in which DECT communication unit 73 is operating (YES in Step S60), control section 10 determines that the DECT communication operation is to be stopped, starts the indoor mode in Step S61 described above, and performs control such that switch 34 is turned off to stop the operation of DECT communication unit 73.

As the "DECT" button is operated when mobile information terminal 2 is in the state in which DECT communication unit 73 is operating and communication with base unit 1 can be performed (TDMA synchronization is established), the DECT communication operation is stopped, and a display operation to indicate "No DECT connection" is performed. In this state, mobile information terminal 2 does not perform the open search operation of searching for a signal transmitted from base unit 1 at all, and thus power consumption can be reduced. For example, performing this operation when the user goes out with mobile information terminal 2 makes it possible for the secondary battery of mobile information terminal 2 to last for a long time.

When the supply of power to the communication block is blocked in Step S62, the first timer is started by timer section 33 that counts a low-speed clock signals transmitted from first clock generating section 32 by being triggered upon the blocking of the power to the communication block. Thereafter, while the communication operation of DECT communication unit 73 is stopped, the first timer counts up.

Even while the operation of DECT communication unit 73 is stopped, as described above, the "DECT" button used by the user for issuing an instruction used for starting DECT communication is displayed on operation display section 11.

In Step S63, while the first timer is performing the counting operation (before the first timer expires), the communication operation of DECT communication unit 73 is stopped (NO in Step S63). When the above-described "DECT" button is operated in this state (YES in Step S64), main control section 10 detects the operation, and main control section 10 performs control such that switch 34 is turned on using the detection as a trigger.

Further, even when the user performs the operation for requesting the incoming call history in this state (YES in Step S65), main control section 10 detects the operation, and main control section 10 performs control such that switch 34 is turned on using the detection as a trigger.

When main control section 10 turns on switch 34, and power is supplied to the communication block of DECT communication unit 73, the process proceeds to Step S51 described above, power is supplied to DECT communication unit 73, and in Step S52, DECT communication control section 28 instructs communication section 27 to start the reception operation. Further, information on the operation is transferred from main control section 10 to DECT communication control section 28. After this, the operations of Step S52 and subsequent steps described above are performed again, and the communication operation of DECT communication unit 73 is resumed.

When neither the operation on the "DECT" button nor the operation for requesting the incoming call history has been performed as the determination results made in Step S64 and Step S65 (NO in Step S64 and NO in Step S65), the process returns to Step S63, and the communication operation of DECT communication unit 73 is stopped until the first timer expires.

In a case where the first timer has expired (Yes in Step S63) as a result of the determination made in Step S63, the flow returns to Step S51. Also in this case, DECT communication control section 28 instructs radio communication section 27 to start a reception operation, the operations of Step S52 and subsequent steps described above are performed again, and the communication operation of DECT communication unit 73 is resumed.

In Step S44, base unit 1 receives a notification signal relating to an event from the above-described mobile information terminal or the other portable handsets and performs communication for checking the states of the portable handsets. In addition, in a case where a voice phone call is started through the fixed-line telephone network, base unit 1 transmits or receives voice data to/from the mobile information terminal or any other portable handset by using one slot for each of uplink/downlink.

Further, when 802.11 standard communication section 72 of mobile information terminal 2 is operating, communication is performed between mobile information terminal 2 and an access point according to the 802.11 standard as necessary.

Further, when a signal for requesting the incoming call history is transmitted from mobile information terminal 2, base unit 1 transmits information related to the missed incoming call history to mobile information terminal 2 according to the request from mobile information terminal 2.

In Step S45, it is determined whether or not there is a portable handset out of registered portable handsets that has not responded to the control signal transmitted from the base unit 1. In a case where there is a portable handset that has not responded to the request from the base unit (Yes in Step S45), in Step S46, the information of a portable handset management section of registration information storing section 85 is updated, and a flag of "No response" is set for the portable handset. On the other hand, in a case where there is no portable handset that has not responded to the request from the base unit 1 in Step S45 (No in Step S45), the flow returns to Step S41.

Figure 8:
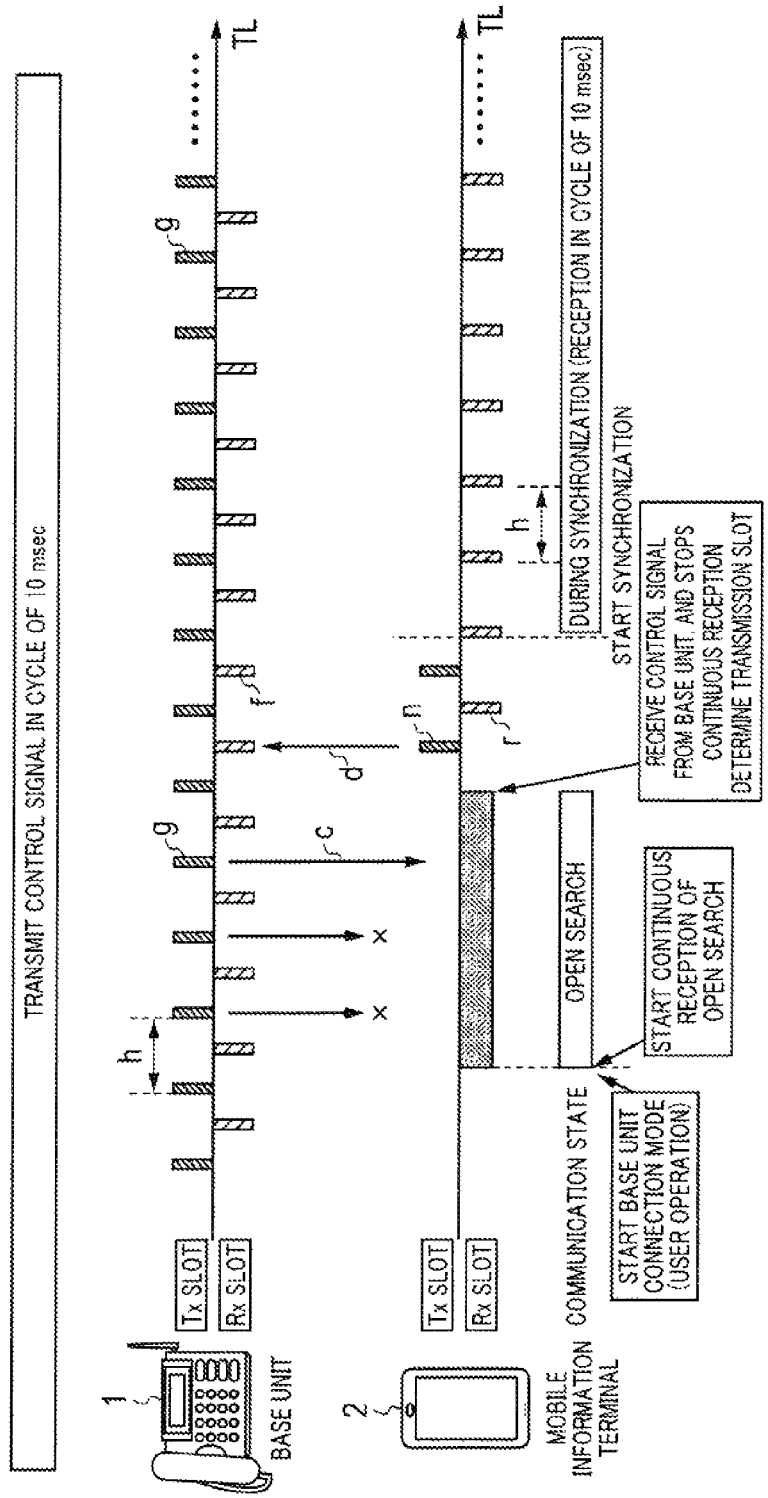
FIG. 8 is a timing diagram that illustrates an operation example of the mobile information terminal for being synchronized with the base unit in the wireless communication system.
Figure 9:
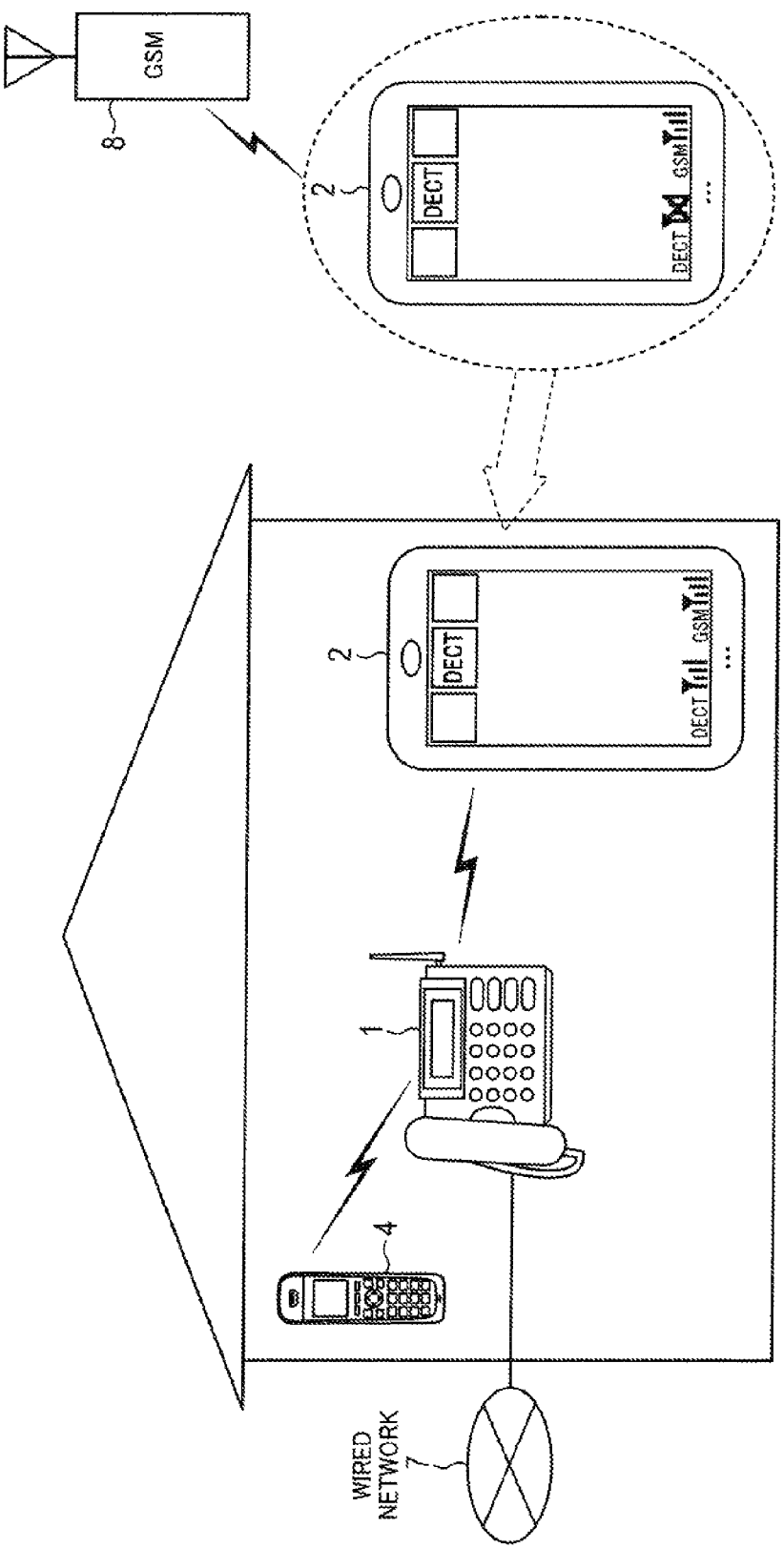
FIG. 9 is a schematic diagram that illustrates an example of a case where a user having the mobile information terminal with him returns home in the wireless communication system according to the present invention.

FIG. 8 is a timing diagram that illustrates an example of the operation of mobile information terminal 2 for being synchronized with base unit 1 in the wireless communication system. As described above, base unit 1 transmits a control signal in a predetermined transmission slot in cycle "h" by using a predetermined reception frequency. Here, "h" represents one frame (10 ms) of DECT.

In a case where mobile information terminal 2 starts the operation by being supplied with power or in a case where a base unit connection mode is started as a predetermined operation is performed, DECT communication control section 28 starts timer section 23 and controls radio communication section 27 so as to perform continuous reception (open search) for searching a signal transmitted from base unit 1. In the open search, a continuous reception operation is performed with the reception frequency being changed, received data is transmitted to frame processing section 26, and information is extracted therefrom.

When the reception frequency of radio communication section 27 and the transmission frequency of the control signal (symbol "C" illustrated in FIG. 8) coincide with each other at specific timing, the data of the signal received by radio communication section 27 is transmitted to frame processing section 26, and when there is the information for synchronization, it is recognized that the control signal transmitted from base unit 1 has been received, and DECT communication control section 28 stops the continuous reception at a time point at which the information for synchronization is provided.

In a case where a control signal transmitted from base unit 1 has not been received, DECT communication control section 28 repeats the open search during a predetermined period. When the control signal is not received from base unit 1 although the open search has been performed during the predetermined period, then mobile information terminal 2 enters the sleep state.

In a case where the control signal (symbol "C" illustrated in FIG. 8) can be received from base unit 1 using one slot in the open search, DECT communication control section 28 can receive timing information included in the control signal transmitted from base unit 1. Thus, DECT communication control section 28 determines a transmission slot (slot n) used for transmitting a response signal based on the timing information and starts preparing the transmission of the response signal. Then, mobile information terminal 2 transmits the response signal using slot n. In addition, DECT communication control section 28 determines a reception slot (slot r) used for receiving a control signal thereafter based on the timing information transmitted from base unit 1 with being carried in the control signal.

Meanwhile, when the response signal transmitted from mobile information terminal 2 using slot n is received, base unit 1 updates the information of the portable handset state management section of registration information storing section 85 and sets a flag of "response present" for mobile information terminal 2.

DECT communication control section 28 of mobile information terminal 2 transmits a response signal using the transmission slot (slot n) for a predetermined number of times or until a necessary notification is completed. Thereafter, DECT communication control section 28 performs a reception operation using the reception slot (slot r) used for receiving a control signal and maintains the synchronization with base unit 1 while receiving a control signal transmitted from base unit 1. In this way, within a range in which signals arrive at respective devices, mobile information terminal 2 can communicate with base unit 1 with being synchronized therewith, for example, as illustrated in FIG. 2.

For example, when the user goes out with mobile information terminal 2, and mobile information terminal 2 become far apart from base unit 1 and is outside the signal arrival zone as illustrated in FIG. 7, DECT communication unit 73 does not perform an operation of continuously searching for base unit 1. DECT communication unit 73 is started at an interval defined by the first timer and searches for base unit 1, and when DECT communication unit 73 ends searching for base unit 1, DECT communication unit 73 enters the sleep state (S60 to S64 in FIG. 6).

When mobile information terminal 2 is outside the signal arrival zone as described above, by performing a display operation (an x mark in FIG. 7) to indicate "DECT non-connection," the mobile information terminal 2 can call user's attention. Even when mobile information terminal 2 is in the sleep state, if the user operates the "DECT" button 2a or operates an "outside line call origination" button or a setting menu illustrated in FIG. 13 to perform an operation for requesting the incoming call history, DECT communication unit 73 of mobile information terminal 2 resumes its operation, and starts the continuous reception operation (the open search) for searching a signal transmitted from base unit 1.

For example, when the user returns home with mobile information terminal 2, and then the user performs a predetermined operation for requesting the incoming call history in the state in which mobile information terminal 2 is within a range where a signal from base unit 1 is receivable, mobile information terminal 2 receives the control signal of base unit 1 through the open search and thus can resume communication with base unit 1 immediately.

Here, the interval defined by the first timer, for example, may be one to two minutes. Further, when it is desired to further reduce power consumption of mobile information terminal 2, the interval may be a maximum of 5 minutes.

A description will be more specifically given of, with reference to the drawings, a record of the presence or absence of incoming call history and a message to be recorded by base unit 1, and an operation and a display operation of mobile information terminal 2 in the wireless communication system of the present invention having the above-described configuration.

FIG. 10 illustrates incoming call history information to be recorded in base unit 1. When there is an incoming call through wired network 7, base unit 1 records the incoming call information (a caller telephone number, a caller name, a time, and the like). When an incoming call is received but no one answers, "non-answered" is recorded in an item of an answer flag as in FIG. 10. Further, when an incoming call is received and a caller records a voice mail message, an ID number identifying each message is recorded in an item of a message ID of the incoming call history information. The incoming call history information is stored in EEPROM 79 of base unit 1 as a file.

When the connection request including the incoming call history request is received from mobile information terminal 2 as described above, base unit 1 transmits information related to the missed incoming call history to mobile information terminal 2 as display data. As a result, mobile information terminal 2 can receive the display data transmitted from base unit 1 and display the display data through operation display section 11. As a result, if there is missed incoming call history while the user is out with mobile information terminal 2 and then returned home, a list of the missed incoming call history is displayed, and the user thus can recognize a missed incoming call only by connecting mobile information terminal 2 with the base unit. When there is a missed incoming call, the user mostly makes a phone call to the call origination source. Thus, displaying the history when there is a missed incoming call improves the usability.

Figure 11:
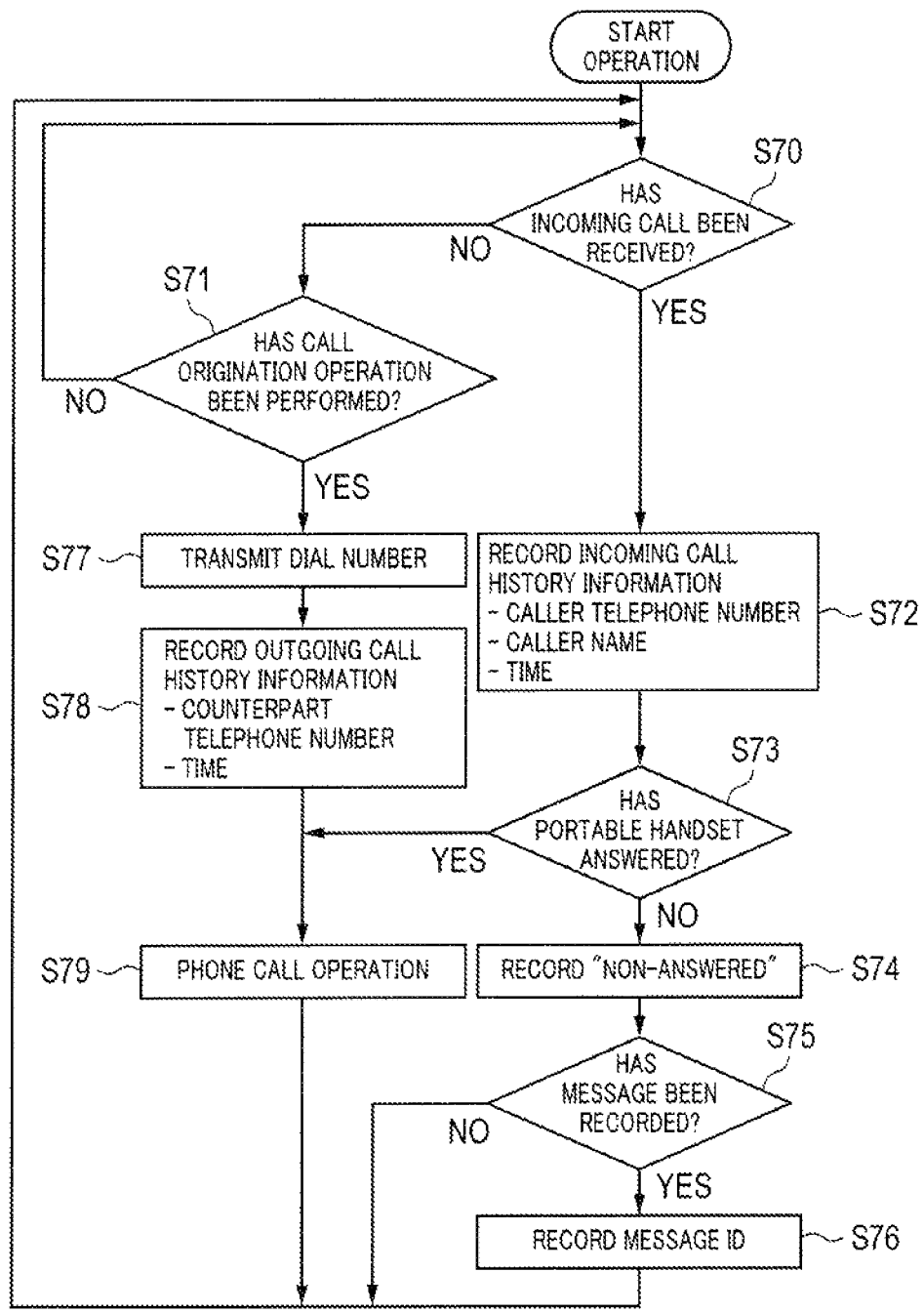
FIG. 11 is a flowchart that illustrates an operation example of transmitting non-answered incoming call history from the base unit to the mobile information terminal in the wireless communication system.

FIG. 11 is a flowchart that illustrates an example of the operation of transmitting non-answered incoming call history from base unit 1 to mobile information terminal 2. Further, as identification information identifying mobile information terminal 2 is registered to base unit 1 of the wireless communication system, mobile information terminal 2 can operate as a portable handset of base unit 1, similarly to wireless handset 4.

As illustrated in FIG. 11, first, base unit 1 is on standby for an incoming call through wired network 7 (Step S70), and determines whether or not a call origination operation has been performed (Step S71). When there is neither an incoming call nor a call origination operation, the standby state is maintained (NO in Step S70 and NO in Step S71).

Upon detecting an incoming call via line control section 63 (YES in Step S70), base unit 1 stores caller name information and incoming call time information in history information recording section 82a of base unit 1 when there is telephone number information or a caller name identifying the call origination source (Step S72).

Then, when the incoming call has not been answered by base unit 1 or wireless handset 4 (NO in Step S73), the incoming call is processed as a missed incoming call, and "non-answered" is recorded in the item of the answer flag (Step S74). Further, when there has been an incoming call and the caller has recorded a message (YES in Step S75), an ID number identifying each message is recorded in the item of the message ID (Step S76).

Further, even when no incoming call is detected, base unit 1 determines whether or not a call origination operation has been performed (Step S71), performs an operation of originating a call using a dial number when determining that the call origination operation has been performed (Step S77), and stores a counterpart telephone number and time information in history information recording section 82a of base unit 1 as outgoing call history (Step S78). As described above, base unit 1 accumulates the incoming call history, the presence or absence of the answer, or the outgoing call history.

When the incoming call has been answered by base unit 1 or wireless handset 4 (YES in Step S73) or when the process of Step S78 has been performed, in Step S79, base unit 1 performs a phone call operation, and the flow returns to Step S70.

A DECT communication program among application programs operating on mobile information terminal 2 (hereinafter, referred to as a "DECT application"), while the "DECT connection" mode is activated by operating the "DECT" button by the user, DECT communication control section 28 instructs communication section 27 to perform the reception operation (the open search) of searching for a signal transmitted from base unit 1. The open search is continuously performed frequently as necessary, and when the open search has been continuously performed during a predetermined period of time but no signal transmitted from base unit 1 has been detected, switching to an intermittent open search that is performed at every predetermined period of time is performed.

Further, even when mobile information terminal 2 is in the "no DECT connection" state as the user operates the "DECT" button in the "DECT connection" state, as a predetermined operation activating a function including a base unit connection operation is performed, control section 10 performs control such that switch 34 is forcibly turned on, and thus power is supplied to the communication block of DECT communication unit 73. DECT communication control section 28 instructs radio communication section 27 to start the reception operation (the open search) of searching for a signal transmitted from base unit 1.

Further, the intermittent open search time interval is set to increase as the number of signal detection failures increases, and the open search for a base unit signal is performed once at a maximum of 5 minutes.

Even when the intermittent open search time interval is long, mobile information terminal 2 starts the open search for the base unit signal using a predetermined operation including a DECT connection request as a trigger when the user performs the predetermined operation through operation display section 11. For example, when the user desires to check the missed incoming call history immediately after returning home from outside, the user can start the open search even before 5 minutes elapses from the previous search and resume a connection with base unit 1 by the DECT by performing an operation of checking the incoming call history through operation display section 11.

Figure 12:
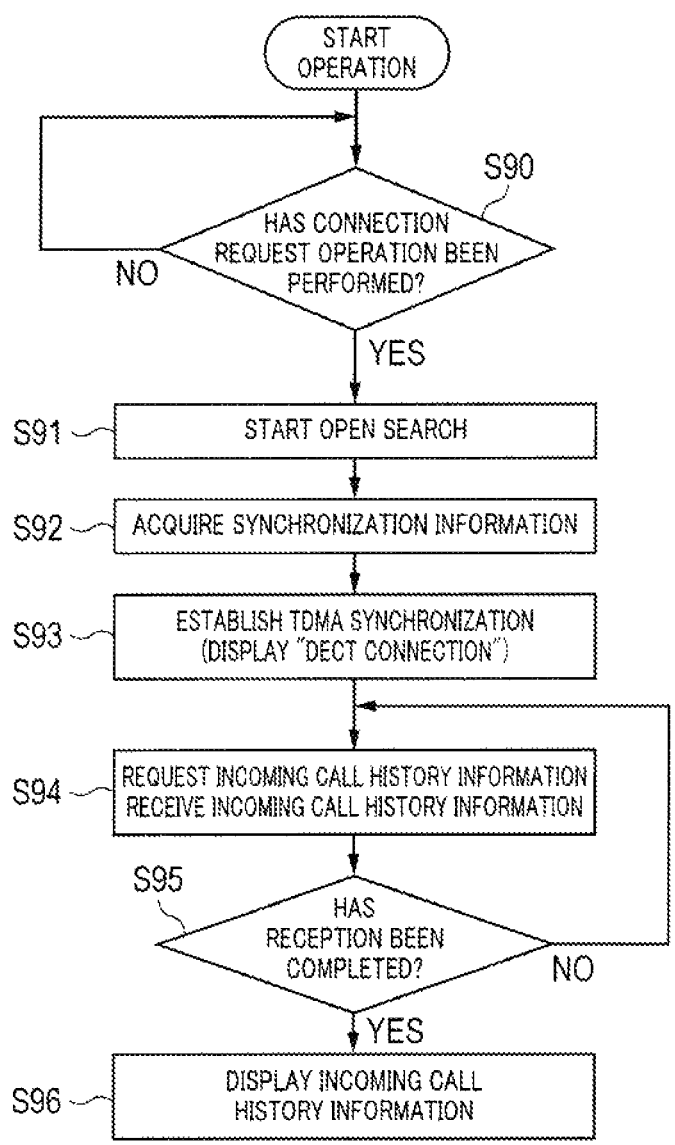
FIG. 12 is a flowchart that illustrates an operation example of acquiring non-answered incoming call history through the mobile information terminal in the wireless communication system.

FIG. 12 is a flowchart that illustrates an operation example of acquiring the non-answered incoming call history by mobile information terminal 2. Mobile information terminal 2 determines whether or not an operation including a connection request to base unit 1 has been performed (Step S90). Examples of this operation including the connection request include an outside line call origination operation, an extension call origination operation, and incoming call history check operation. Further, an operation of transferring a telephone directory to base unit 1 and an operation of performing various settings on the base unit are included as well.

For example, when the user performs the operation of checking the incoming call history through operation display section 11 (YES in S90), main control section 10 turns on switch 34, and thus power is supplied to the communication block of DECT communication unit 73, and DECT communication control section 28 starts the open search (Step S91).

Figure 13:
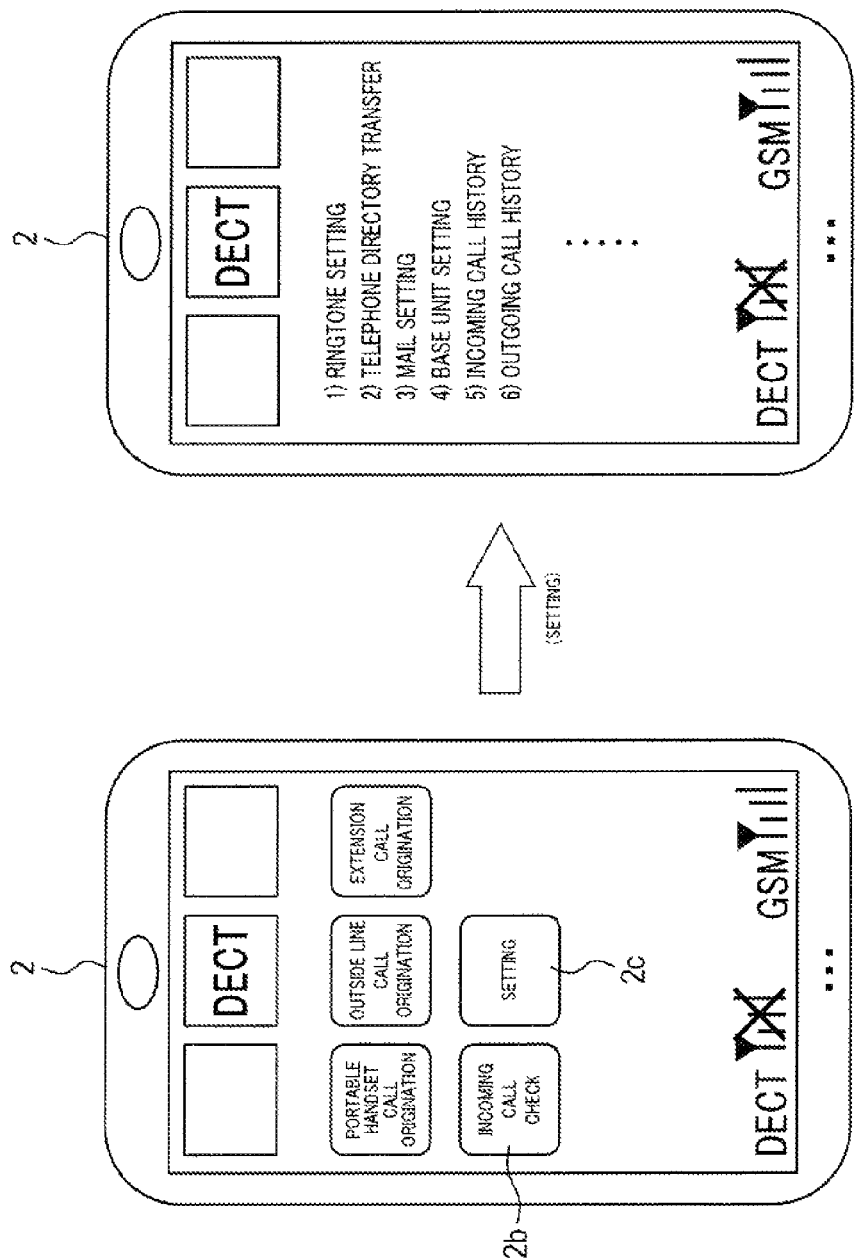
FIG. 13 is an explanatory diagram that illustrates an example of how a screen of the mobile information terminal is displayed in the wireless communication system according to the present invention.

FIG. 13 illustrates an example of operation display section 11 of mobile information terminal 2. When the user presses down an icon 2b "incoming call check" on operation display section 11, power is supplied to the communication block of DECT communication unit 73, and the operation of searching for base unit 1 starts. Alternatively, even when an icon "outside line call origination" or "extension call origination" on operation display section 11 is pressed down, the operation of searching for base unit 1 starts. Alternatively, when an icon 2c "setting" on operation display section 11 is pressed down, switching to a menu display of various setting functions is performed, and when a function needing communication with base unit 1 such as "telephone directory transfer," "base unit setting," or "outgoing call history" in the displayed menu is selected, the operation of searching for base unit 1 starts as well.

Similarly to the case described with reference to FIG. 6, when the control signal can be received from base unit 1, mobile information terminal 2 starts communication in synchronization with base unit 1 according to the DECT protocol. In other words, DECT communication control section 28 extracts information necessary for synchronization from the control signal transmitted from base unit 1 (Step S92), determines a slot and a frequency used for transmission performed by base unit 1 based on the information, and determines a slot and a frequency to be used for transmission from mobile information terminal 2 to base unit 1 based on the information, and radio communication section 27 performs synchronous communication with base unit 1 according to the information (Step S93).

When synchronous communication starts between mobile information terminal 2 and base unit 1, mobile information terminal 2 transmits the notification signal for requesting the incoming call history information to base unit 1 according to the operation of checking the incoming call history performed by mobile information terminal 2. Base unit 1 receives the notification signal from the above-described mobile information terminal 2, and transmits the incoming call history information to mobile information terminal 2 when mobile information terminal 2 has requested the incoming call history information (Step S94).

In FIG. 12, when the reception of the information transmitted from base unit 1 is completed (YES in Step S95), mobile information terminal 2 causes the incoming call history information to be displayed on operation display section 11 (Step S96). An example of how incoming call history information is displayed on operation display section 11 of mobile information terminal 2 at this time is illustrated in FIG. 14.

Figure 14:
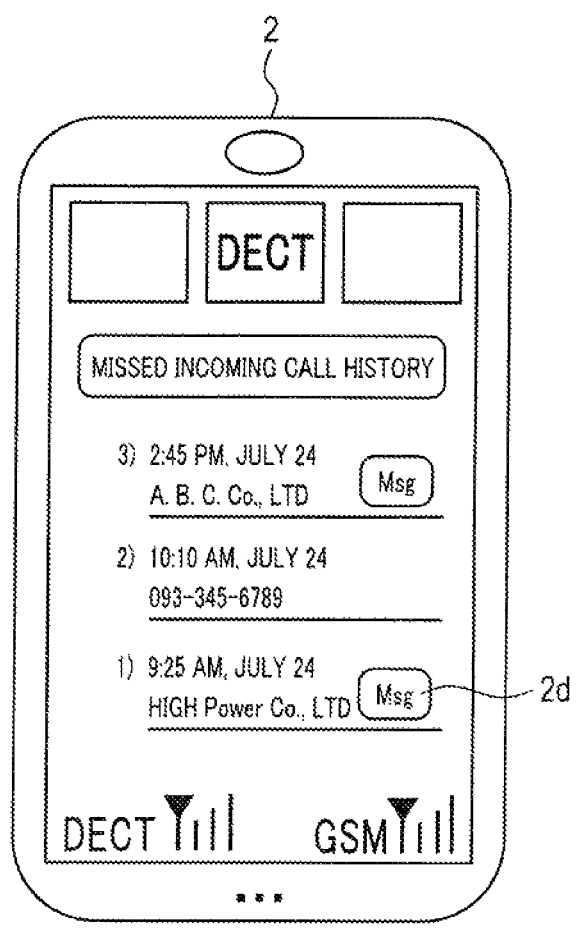
FIG. 14 is an explanatory diagram that illustrates an example of how non-answered incoming call history is displayed on the mobile information terminal in the wireless communication system according to the present invention.

In an example of FIG. 14, the non-answered incoming call information of the latest 3 cases is displayed on operation display section 11. For example, for an incoming call from "HIGH Power Co., LTD" 9:25 am, July 24, icon 2d "Msg" indicates that a voice mail message has been recorded. Further, for an incoming call 10:10 am, July 24, a telephone number is displayed since information about a name of a caller side is not acquired.

Figure 15:
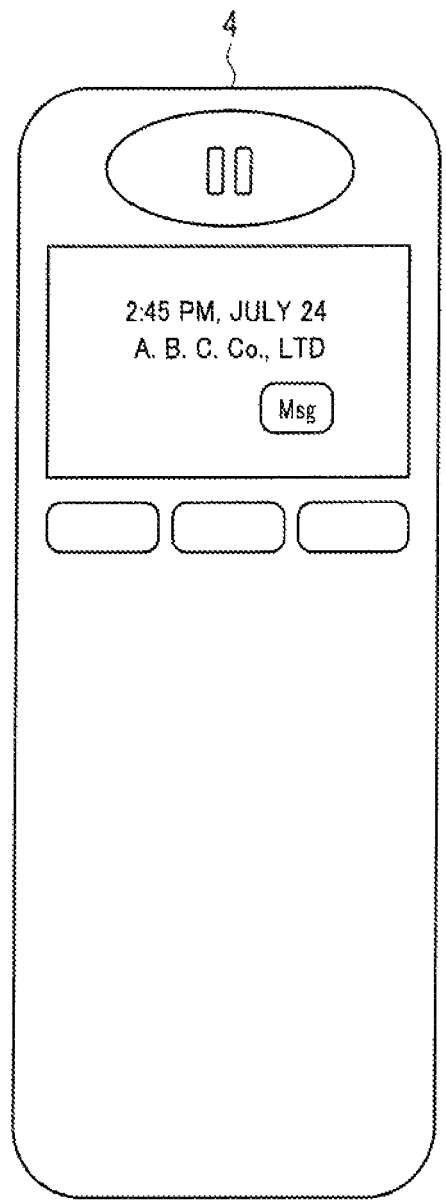
FIG. 15 is an explanatory diagram that illustrates an example of a screen of the wireless handset registered to the wireless communication system according to the present invention.

Further, the above description has been made in connection with the example in which the incoming call history information is displayed on operation display section 11 of mobile information terminal 2, but the incoming call history information may be displayed even on wireless handset 4 at home. FIG. 15 illustrates an example in which non-answered incoming call information is displayed on a display section of wireless handset 4. Here, the display section of wireless handset 4 is small in size, and thus the number of cases that can be displayed each time is one, and the user needs to view a plurality of incoming call history information items by scrolling the information.

As described above, in the wireless communication system according to this embodiment, it is possible to originate a call via wired network 7 using mobile information terminal 2 via base unit 1 and make a phone call via wired network 7 using mobile information terminal 2 as well as wireless handset 4. Further, when the user who has returned home from outside with mobile information terminal 2 performs an operation using a function including an operation to connect to base unit 1, mobile information terminal 2 immediately starts the base unit search operation, and transmits the connection request to base unit 1 when the control signal of base unit 1 is detected. Thus, when there is missed incoming call history, information of the missed incoming call history is transmitted from base unit 1 to mobile information terminal 2 as display data, and displayed on operation display section 11 of mobile information terminal 2, and thus the user can be aware of the missed incoming call history through the screen of mobile information terminal 2 held by his or her hand.

In the wireless communication system, it is possible to start DECT communication even by the "DECT" button of mobile information terminal 2, but when the user desires to immediately check the non-answered incoming call information after returning home, the user only has to operate an icon "incoming call check" without needing to operate the "DECT" button, and thus DECT communication unit 73 of mobile information terminal 2 resumes its operation, and a desired operation can be performed immediately.

Further, in the wireless communication system according to this embodiment, not only when "incoming call check" is performed, but also when an operation (a predetermined operation) of starting the function including the operation to connect to the base unit is performed, the base unit search operation starts automatically. Thus, even in a case where the DECT communication function is set in the off state by the "DECT" button, when the predetermined operation is performed, mobile information terminal 2 automatically starts the base unit search operation, and performs switching to the indoor mode automatically using detection of the control signal of base unit 1 as a trigger when the control signal of base unit 1 is detected, and thus the user need not care for switching to the indoor mode.

Further, by operating operation display section 11 of mobile information terminal 2, the operation content is transmitted to base unit 1, and for example, the user can make a phone call to the call origination source of a missed incoming call immediately. As described above, it is possible to obtain the convenience that a display operation and user operations can be performed using mobile information terminal 2 having a higher functionality and a wider display screen instead of wireless handset 4 with limited functions. Further, in addition to displaying a record of a missed incoming call on operation display section 11 to visually attract user's attention, it is also possible to make a notification sound or the like to call user's attention when the user returns home and there is non-answered incoming call information.

Embodiment 2

Further, in the above example, mobile information terminal 2 performs the operation of searching for base unit 1 at intervals (a first predetermined cycle) specified by the first timer after mobile information terminal 2 becomes unable to communicate with base unit 1, but it is possible to make the interval longer after a predetermined period further elapses. Frequent searches for base unit 1 performed by mobile information terminal 2 even when mobile information terminal 2 cannot receive a signal from base unit 1 leads to unnecessary battery consumption, so that it is possible to sequentially increase the search cycle, for example, up to a maximum of 5 minutes.

In other words, after mobile information terminal 2 becomes unable to communicate with base unit 1, mobile information terminal 2 searches for base unit 1 in the first predetermined cycle specified by the first timer, then changes an expiration value of the first timer when the next predetermined period elapses, and sets an expiration value (a second predetermined cycle) longer than the first predetermined cycle to the first timer.

Even when the user goes out without operating the "DECT" button, an increase in the cycle for searching for base unit 1 in a stepwise manner makes the execution cycle of the base unit search operation very long, and thus the useless operation of mobile information terminal 2 can be reduced, and the secondary battery of mobile information terminal 2 outside of the home can last for a long time. Further, when the user returns home in this state, the operation of searching for the base unit is performed at least within a maximum cycle (for example, 5 minutes), so that mobile information terminal 2 can be automatically reconnected with base unit 1 and can notify the user of information such as the missed incoming call history.

The wireless communication system and the mobile information terminal according to the present invention can automatically switch an operation mode and reduce power consumption by eliminating a useless operation when a short range communication apparatus and a highly functional mobile information terminal operate in cooperation.

INCORPORATION BY REFERENCE

The present application claims priority from Japanese application No. 2013-158967 filed on Jul. 31, 2013, the content of which is hereby incorporated by reference into this application.

The invention claimed is:
1. A wireless communication system comprising:
a base station connectable to a wired network; and
a mobile information terminal connectable to a public radio network and to the base station, the mobile information terminal including:

a short range communicator which, in operation, communicates with the base station;
a public radio communicator which, in operation, performs radio communication via the public radio network;
a functional operator which, upon user selection, initiates a connection process or a disconnection process of a short range communication link with the base station;
an incoming data retrieval operator, which is different from the functional operator;
a screen; and
a controller which, in operation,
when the functional operator is selected in a state in which the short range communication link is connected, executes the disconnection process of the short range communication link;
when the functional operated operator is selected in a state in which the short range communication link is disconnected, executes the connection process of the short range communication link; and
when the incoming data retrieval operator is selected in a state in which the short range communication link is disconnected, executes the connection process of the short range communication link and displays incoming data, which was recorded in the base station while the short range communication link was disconnected, on the screen of the mobile information terminal.

2. The wireless communication system according to claim 1, wherein the incoming data includes incoming call history information of the base station.

3. The wireless communication system according to claim 1, wherein the incoming data includes a voice mail message recorded in the base station.

4. The wireless communication system according to claim 1, wherein, when the mobile information terminal cannot receive a signal from the base station, the mobile information terminal repeats an open search for a signal from the base station for a predetermined period and then enters in a sleep state after the predetermined period.

5. The wireless communication system according to claim 1, wherein, when the mobile information terminal cannot receive a signal from the base station, the mobile information terminal performs an intermittent operation in which the controller executes the connection process of the short range communication link and searches for the base station in a first predetermined cycle for a predetermined period, and after the predetermined period elapses, the mobile information terminal performs an intermittent operation in which the controller executes the connection process of the short range communication link and searches for the base station in a second predetermined cycle that is longer than the first predetermined cycle.

6. The wireless communication system according to claim 1, wherein, when the mobile information terminal becomes unable to communicate with the base station, the controller displays on the screen an indication that the short range communication link is disconnected.

7. The wireless communication system according to claim 1, wherein the mobile information terminal further includes a touch panel and, in operation, connects to a mobile telephone network and the Internet via the public radio network.

8. A mobile information terminal comprising:
a short range communicator which, in operation, communicates with a base station of a wireless communication system;
a public radio communicator which, in operation, performs radio communication via a public radio network;
a functional operator which, upon user selection, initiates a connection process or a disconnection process of a short range communication link with the base station;
an incoming data retrieval operator, which is different from the functional operator;
a screen; and
a controller which, in operation,
when the functional operator is selected in a state in which the short range communication link is connected, executes the disconnection process of the short range communication link;
when the functional operated operator is selected in a state in which the short range communication link is disconnected, executes the connection process of the short range communication link; and
when the incoming data retrieval operator is selected in a state in which the short range communication link is disconnected, executes the connection process of the short range communication link and displays incoming data, which was recorded in the base station while the short range communication link was disconnected, on the screen of the mobile information terminal.

9. The mobile information terminal according to claim 8, wherein the incoming data includes incoming call history information of the base station.

10. The mobile information terminal according to claim 8, wherein the incoming data includes a voice mail message recorded in the base station.

11. The mobile information terminal according to claim 8, wherein, when the mobile information terminal cannot receive a signal from the base station, the mobile information terminal repeats an open search for a signal from the base station for a predetermined period and then enters in a sleep state after the predetermined period.

12. The mobile information terminal according to claim 8, wherein, when the mobile information terminal cannot receive a signal from the base station, the mobile information terminal performs an intermittent operation in which the controller executes the connection process of the short range communication link and searches for the base station in a first predetermined cycle for a predetermined period, and after the predetermined period elapses, the mobile information terminal performs an intermittent operation in which the controller executes the connection process of the short range communication link and searches for the base station in a second predetermined cycle that is longer than the first predetermined cycle.

13. The mobile information terminal according to claim 8, wherein, when the mobile information terminal becomes unable to communicate with the base station, the controller displays on the screen an indication that the short range communication link is disconnected.

14. The mobile information terminal according to claim 8, wherein the mobile information terminal further includes a touch panel and, in operation, connects to a mobile telephone network and the Internet via the public radio network.

15. The mobile information terminal according to claim 8, wherein the short range communicator is a digital enhanced cordless telecommunications (DECT) communicator.

16. The wireless communication system according to claim 1, wherein the short range communicator of the mobile information terminal is a digital enhanced cordless telecommunications (DECT) communicator.

* * * * *